US008659783B2

(12) United States Patent
Sasaki

(10) Patent No.: US 8,659,783 B2
(45) Date of Patent: Feb. 25, 2014

(54) PRINTING APPARATUS, METHOD FOR CONTROLLING THE SAME, AND STORAGE MEDIUM

(75) Inventor: Hidemi Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 552 days.

(21) Appl. No.: 12/889,301

(22) Filed: Sep. 23, 2010

(65) Prior Publication Data

US 2011/0080614 A1    Apr. 7, 2011

(30) Foreign Application Priority Data

Oct. 5, 2009   (JP) ................................. 2009-231434

(51) Int. Cl.
*G06K 15/00*    (2006.01)
*G06F 3/12*    (2006.01)

(52) U.S. Cl.
USPC ....... 358/1.18; 358/1.15; 358/1.16; 358/1.17; 358/1.13; 358/1.14; 399/389

(58) Field of Classification Search
None
See application file for complete search history.

(56) References Cited

U.S. PATENT DOCUMENTS

| 7,394,558 B2 * | 7/2008 | Stringham .................... 358/1.15 |
| 2006/0239731 A1 * | 10/2006 | Suzuki et al. ................. 399/389 |
| 2007/0201927 A1 * | 8/2007 | Inaba ............................. 400/62 |
| 2008/0030769 A1 * | 2/2008 | Hanaoka et al. ............. 358/1.15 |
| 2008/0144105 A1 * | 6/2008 | Yagi .............................. 358/1.16 |
| 2009/0002730 A1 * | 1/2009 | Yamada et al. ................ 358/1.9 |
| 2009/0040561 A1 * | 2/2009 | Sasaki .......................... 358/1.18 |
| 2009/0168099 A1 * | 7/2009 | Yamada ....................... 358/1.15 |
| 2009/0219576 A1 * | 9/2009 | Akiyama et al. ............. 358/1.16 |
| 2010/0195141 A1 * | 8/2010 | Fan et al. ..................... 358/1.15 |
| 2011/0194128 A1 * | 8/2011 | Kurihara et al. ............... 358/1.9 |

FOREIGN PATENT DOCUMENTS

| JP | 2001058439 A | 3/2001 |
| JP | 2005-212124 A | 8/2005 |
| JP | 2008-260148 A | 10/2008 |
| JP | 2009042836 A | 2/2009 |

* cited by examiner

*Primary Examiner* — Satwant Singh
(74) *Attorney, Agent, or Firm* — Canon USA Inc. IP Division

(57) ABSTRACT

A printing apparatus includes a setting unit configured to set information for determining output paper information before receiving the print data in response to an instruction entered via an operation panel of the printing apparatus, a determination unit configured to determine, based on page size information specified in the print data, fixed-size paper corresponding to the page size information, and an image output unit configured to print, when the fixed-size paper corresponding to the page size information cannot be determined by the determination unit, the print data using paper selected by the set information.

3 Claims, 6 Drawing Sheets

FIG.4A

```
COMMON SPECIFICATION SETTINGS
    ■ PAPER SIZE                                    ▶
        ▷ AUTO
    ■ AUTOMATIC ENLARGEMENT/REDUCTION               ▶
        ▷ NO
    ■ PRINTING AREA ENLARGEMENT                     ▶
        ▷ NO
    ■ RENDERING ORIGIN                              ▶
        ▷ TOP LEFT
    ■ AUTOMATIC ROTATION                            ▶
        ▷ NO
        ▼  1/4  △

CLOSE  ⌐|
                                  SYSTEM STATUS/CANCEL ▶
```

FIG.4B

```
COMMON SPECIFICATION SETTINGS
    ■ UNFIXED-SIZE PAPER CORRECTION SETTING         ▶

■ UNFIXED-SIZE PAPER AUTOMATIC CORRECTION MODE  ▶
        ▷ YES (AUTOMATIC)
    ■ UNFIXED-SIZE PAPER AUTOMATIC CORRECTION CONDITION  ▶
        ▷ ONE PAGE

▼  2/4  ▲

CLOSE  ⌐|
                                  SYSTEM STATUS/CANCEL ▶
```

FIG.4C

| UNFIXED-SIZE PAPER CORRECTION SETTING |
|---|
| ■ PAPER SIZE<br>▷ A4 |
| ■ AUTOMATIC ENLARGEMENT/REDUCTION<br>▷ YES |
| ■ PRINTING AREA ENLARGEMENT<br>▷ YES |
| ■ RENDERING ORIGIN<br>▷ CENTER |
| ■ AUTOMATIC ROTATION<br>▷ YES |
| CLOSE |
| SYSTEM STATUS/CANCEL ▶ |

PRINTING APPARATUS, METHOD FOR CONTROLLING THE SAME, AND STORAGE MEDIUM

BACKGROUND OF THE INVENTION

1. Field of the Invention

The present invention relates to a printing apparatus having a direct printing function, a method for controlling the printing apparatus, and a storage medium.

2. Description of the Related Art

"Direct printing" is known as one of the methods for printing Page Description Language (PDL) data on a sheet printing media by directly transmitting PDL data from a host computer to a suitable printer without using a print driver or an application to preprocess the PDL data. For example, a printable file is generated with an application on the host computer, and the file can be printed by specifying it as PDL data via a web browser or a user interface (UI) on the printer. In other words, direct printing refers to transmitting PDL data to a printer without the intervention of a printer driver. In many cases of direct printing, for example, electronic document formats such as Portable Document Format (PDF) and Extensible Markup Language (XML) Paper Specification (XPS:XML Paper Specification), and image formats such as Tagged Image File Format (TIFF) and Joint Photographic Experts Group (JPEG) are used. One of the greatest advantages of direct printing is that a PDL data file can be printed without opening the file with a dedicated application on the host computer.

However, a problem may arise if the PDL data at the time of printing is not optimized for a target printer from which the data is output. An electronic document format includes page size information such as a logical page size and output paper size information for each page. However, the logical page size specified in the electronic document format is not necessarily applicable to the target printer. As a method for solving this problem, a conventional technique is known for checking sizes of all pages before image formation to determine a reference medium size (for example, refer to Japanese Patent Application Laid-Open No. 2005-212124). Further, there is a technique for arranging page layout so that a page width and height fit into the same series paper larger than paper having a specified size, when alternative paper is used in the case where paper runs out (for example, refer to Japanese Patent Application Laid-Open No. 2008-260148). These techniques are known for optimizing the actually used paper (hereinafter referred to as output paper) according to a type of paper currently fed to the printer or types of paper supported by the printer.

Although data generated by combining data generated by using various types of software conforms to the electronic document format code, such PDL data may become unsuitable for direct printing.

For example, a case may be considered where the unit system of each application used to generate data is not unified causing a difference in a paper size. More specifically, suppose that a width (100 mm) of a postcard can be converted to 3.937007874015 . . . inches. However, when a printing application using non-metric units handles this value as a corrected value of 3.937 inches, the converted value is 99.9998 mm resulting in an error. In contrast, an application employing the International System of Units and handling a length in millimeters can handle the width of the postcard as 100 mm without an error. When a file includes a page containing a size error and a page without the error, the printer recognizes that a different page size is specified for each page.

When a specified page size in PDL data is close to a size of a fixed-size paper, suitable fixed-size paper is selected by ignoring a difference in size through error correction processing, thus obtaining an output which is close to a result desired by a user. However, when the specified size largely deviates from any size of the fixed-size paper, the printer cannot select suitable fixed-size paper since no reference paper size can be found. If a slight size difference has arisen between pages, a different sheet is selected for each page and therefore the user cannot obtain a desired output result. It is difficult therefore for the printer to automatically distinguish whether the slight size difference is caused by a calculation error or a size difference intended by a person in charge of printing. In this case, the printer will handle the PDL data assuming that unfixed-size paper to be used for printing with the page size is specified for each page.

As described above, if there is a slight error in handling of the page size, there is a problem that sufficient measures have not been taken for improving user convenience without sacrificing advantages of direct printing.

For example, two possible methods are assumed as ad-hoc solutions. A first method is to correct PDL data with an application, and a second method is to change print settings and ignore print settings in the PDL data. With the first method, the problem can be prevented from occurring by correcting page size information in the PDL data. However, one of the advantages of direct printing is simplicity, i.e., that data can be printed without opening a relevant file with an application. Therefore, opening a file with an application for correcting the page size of a document defeats the purpose and the advantages of direct printing. Furthermore, in some cases, PDL data has undergone encryption processing and therefore cannot be edited because of a function to prevent data alteration. With the second method, the user specifies the size of the output paper at the time of printing and therefore the page size information in the PDL data is ignored. In this case, since a paper size specified separately from the PDL data will be reflected even to pages having no problem, there may be a situation that an undesirable output or an unexpected result may arise in the case of a file including a plurality of paper sizes.

SUMMARY OF THE INVENTION

The present invention is directed to enabling a user, when a page size is not a size of any fixed-size paper in direct printing, to control output paper and a layout via a user instruction without resetting the paper size and reprinting, thus improving user convenience.

According to an aspect of the present invention, a printing apparatus which performs print processing by interpreting print data received from an information processing apparatus without intervention of a printer driver includes a setting unit configured to set information for determining output paper information before receiving the print data in response to an instruction entered via an operation panel of the printing apparatus, a determination unit configured to determine, based on page size information specified in the print data, fixed-size paper corresponding to the page size information, and an image output unit configured to print, when the fixed-size paper corresponding to the page size information cannot be determined by the determination unit, the print data using paper selected by the set information.

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A to 4C illustrate an exemplary print setting screen according to a first exemplary embodiment of the present invention.

DESCRIPTION OF THE EMBODIMENTS

Various exemplary embodiments, features, and aspects of the invention will be described in detail below with reference to the drawings.

Figure 1:
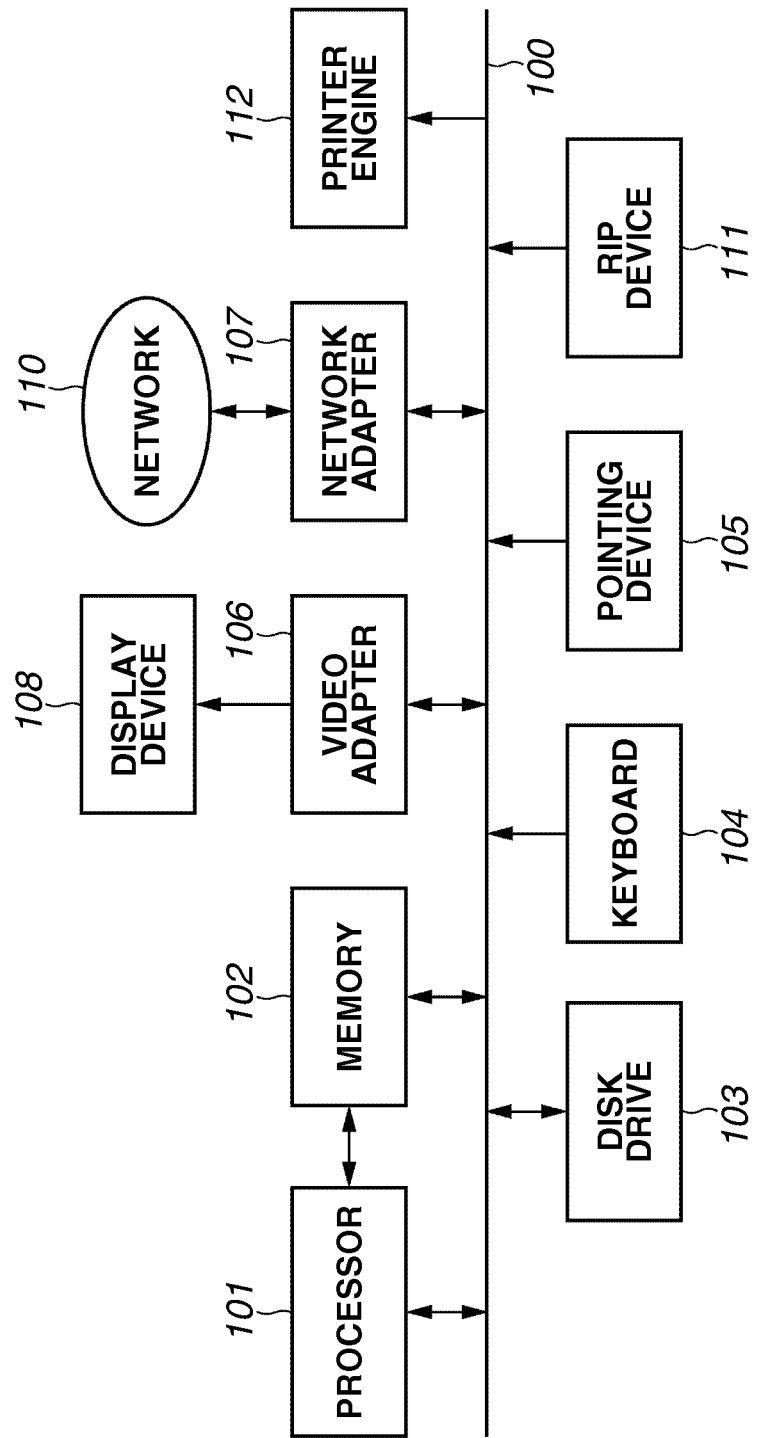
FIG. 1 illustrates an exemplary system configuration according to an exemplary embodiment of the present invention.

FIG. 1 is a block diagram illustrating an exemplary system configuration of a printing apparatus having a direct printing function according to an exemplary embodiment of the present invention. As used herein, direct printing refers to processing performed by an information processing apparatus to transmit PDL data to a printing apparatus without intervention of a printer driver.

A processor 101 connects with a memory 102, a disk drive 103, a keyboard 104, a pointing device 105, a video adapter 106, and a network adapter 107 via a bus 100. Similarly, the processor 101 also connects with a raster image processor (RIP) device 111 and a printer engine 112 via the bus 100. The video adapter 106 connects a display device 108 as a display unit (e.g., an electronic display device structured as a visual, tactile or auditive UI).

The processor 101, as a control unit, controls each of the above described components according to a processing procedure described in a predetermined program stored in the memory 102. Therefore, the memory 102 stores programs and data used by the processor 101. The disk drive 103 records programs and data required by the system.

A user can input information in the system via the keyboard 104 and the pointing device 105. The video adapter 106 displays various pieces of information on the display device 108. The network adapter 107 connects the system to a network 110 to enable data communication with a host computer and a server (not illustrated).

Figure 2:
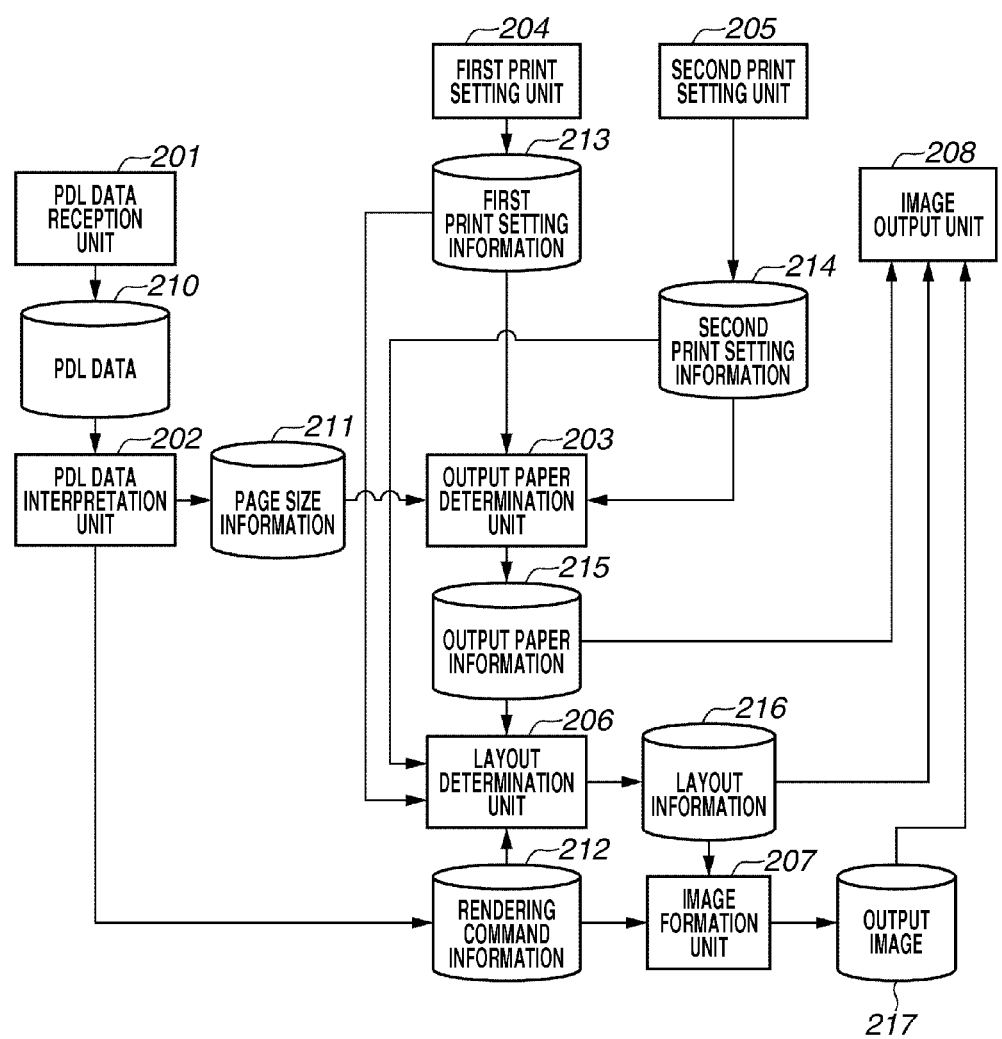
FIG. 2 illustrates a typical functional configuration.

FIG. 2 illustrates an exemplary functional configuration according to an exemplary embodiment of the present invention. A PDL data reception unit 201 may be implemented by using the network adapter 107 to receive PDL data 210 as print data via the network 110. A PDL data interpretation unit 202, an output paper determination unit 203, and a layout determination unit 206 can be implemented by using the processor 101 and a program interpreted and executed by the processor 101. A first print setting unit 204 and a second print setting unit 205 are implemented by using the display device 108 and the pointing device 105. An image formation unit 207 is achieved by using the RIP device 111. An image output unit 208 is achieved by the printer engine 112.

Processing performed by the printing apparatus according to a first exemplary embodiment of the present invention will be described blow with reference to FIG. 2. First, the PDL data reception unit 201 receives the PDL data 210 and transfers the PDL data 210 to the PDL data interpretation unit 202. As a method used by the printer to receive the PDL data 210 from external, a Line Printer Remote (LPR) protocol is commonly known.

The PDL data interpretation unit 202 analyzes the PDL data 210 to acquire page size information 211. The page size information 211 is stored in various formats depending on PDL data, and includes information such as a page width and height and an image orientation. The PDL data interpretation unit 202 analyzes the PDL data 210 also to generate rendering command information 212.

In the first exemplary embodiment, before the reception of the PDL data 210, the first print setting unit 204 and the second print setting unit 205 set first print setting information 213 and second print setting information 214, respectively, via an operation panel. More specifically, before the reception of print data, the first print setting unit 204 and the second print setting unit 205 respectively set these pieces of print setting information for determining output paper information in response to an instruction entered by the user via the operation panel of the printing apparatus. FIGS. 4A to 4C illustrate examples of UI screens which are provided by the first print setting unit 204 and the second print setting unit 205.

FIG. 4A illustrates an example of a screen realized by the first print setting unit 204. In this screen, the user can specify an output paper size, automatic enlargement/reduction, printing area enlargement, a rendering origin, and automatic rotation processing. For the field for setting the output paper size ("Paper size"), the user can select "Auto" or fixed-size paper. When "Auto" is selected, the output paper is selected based on the page size information 211 in the PDL data. When fixed-size paper is selected, the page size information 211 in the PDL data is ignored, and the data is output using paper suitable for the size of the specified fixed-size paper. Automatic specification information for determining the output paper is set by the first print setting unit 204 according to an operation instruction by the user and referred by the output paper determination unit 203.

For the field for setting automatic enlargement/reduction ("Automatic enlargement/reduction"), the user can determine whether the page in the PDL data is to be enlarged or reduced depending on the size of the output paper. Even when a page larger than the size of the output paper is printed, the entire page can be output to one sheet at one time.

For the field for setting enlargement of a printing area as a renderable area on the output paper ("Printing area enlargement"), the user can specify whether a margin by the printer engine 112 is taken into consideration at the time of output image formation. When the margin is not taken into consideration, a gap may arise in a portion rendered in the margin of an image printed on the paper. However, there may be a case where a size of the PDL data is completely the same as the paper size. In such a case, the PDL data may be preferably output without taking into consideration a margin by the printer engine 112.

For the field for setting the rendering reference position ("Rendering origin"), the user can specify a reference position (origin) on the output paper from which a formed image is to be arranged. For the field for setting automatic rotation processing ("Automatic rotation"), the user can specify whether an orientation of the output paper is matched with a page orientation in the PDL data.

Referring to FIG. 4A, an inverted triangle button for moving to a next page is provided at the bottom of a setting column. When the user presses this button, the next page, i.e., a screen illustrated in FIG. 4B, is displayed on the display device 108.

The screen in FIG. 4B displays a button for setting the second print setting information ("Unfixed-size paper correction setting") at the top of the screen. When the user presses this button, a screen illustrated in FIG. 4C is displayed on the display device 108. The screen in FIG. 4B also displays an option for specifying whether automatic correction is performed for pages for which a size of the unfixed-size paper is specified ("Unfixed-size paper automatic correction mode").

When "Yes (Auto)" is selected, paper size selection and automatic layout correction processing for the unfixed-size paper will be performed. When "No" is selected, unfixed-size paper suitable for the page width and height specified in the page size information 211 in respective PDL data is selected.

The screen in FIG. 4B also displays an option for setting a determination condition for whether to perform unfixed-size paper automatic correction ("Unfixed-size paper automatic correction condition"). In this example, automatic correction will be performed when the output paper determination unit 203 requires one or more pages of the unfixed-size paper.

FIG. 4C illustrates an example of a screen displayed by the second print setting unit 204. Since each selection item is similar to that of FIG. 4A, description will be omitted.

Returning to FIG. 2, processing performed by the printing apparatus will be described below. The output paper determination unit 203 determines output paper information 215 based on the first print setting information 213, the second print setting information 214, and the page size information 211. The layout determination unit 206 determines how rendering is performed on the paper based on the first print setting information 213, the second print setting information 214, the output paper information 215, and the rendering command information 212, and generates layout information 216. The image formation unit 207 generates data of an output image 217 based on the layout information 216 and the rendering command information 212. Then, the image output unit 208 outputs an output image with desirable paper and layout based on the output paper information 215, the layout information 216, and the data of the output image 217.

Then, an example of a procedure for processing performed by the output paper determination unit 203 will be described below with reference to the flowchart in FIG. 3. The program describing the processing procedure is stored in the disk drive 103. The following processing routines are carried out by the processor 101 loading the program into the memory 102 and executing the program in accordance with executable instructions represented by the process steps of FIG. 3.

In step S301, the output paper determination unit 203 acquires information about a paper size selection method from the first print setting information 213. In step S302, the output paper determination unit 203 determines whether the paper size selection method is "Auto." When the output paper determination unit 203 determines that the paper size selection method is not "Auto" (NO in step S302), the processing proceeds to step S303. In step S303, the output paper determination unit 203 acquires specified fixed-size paper information from the first print setting information 213. In step S304, the output paper determination unit 203 selects the fixed-size paper information as the output paper information 215.

When the output paper determination unit 203 determines that the paper size selection method is "Auto" (YES in step S302), i.e., when the automatic specification information is set in the first print setting information 213, the process advances to step S311. In step S311, the output paper determination unit 203 selects fixed-size paper based on the page size information 211 in the PDL data. The output paper determination unit 203 retrieves fixed-size paper having a size coinciding with the page width and height included in the specified page size information. Alternatively, fixed-size paper which falls within a predetermined range of difference for the page width and height included in the page size information 211 is selected. In other words, fixed-size paper suitable for the width and height of the relevant page is selected.

In step S312, the output paper determination unit 203 determines whether the fixed-size paper suitable for the page size information 211 has been found. When the output paper determination unit 203 determines that the suitable fixed-size paper is found (YES in step S312), the processing proceeds to step S313. In step S313, the output paper determination unit 203 selects information about the fixed-size paper as the output paper information 215.

When the output paper determination unit 203 determines that fixed-size paper suitable for the page width and height included in the page size information 211 is not found (NO in step S312), the processing proceeds to step S321. In step S321, the output paper determination unit 203 counts a number of pages of unfixed-size paper from when a print job is started to when the processing is reached at this point. More specifically, the output paper determination unit 203 increments by one a value of a counter for counting the number of pages of the unfixed-size paper.

Then, the processing proceeds to step S322, and the output paper determination unit 203 compares the counted number of pages of the unfixed-size paper with a predetermined threshold value. When the output paper determination unit 203 determines that the number of pages of the unfixed-size paper exceeds the threshold value (YES in step S322), the processing proceeds to step S331. When the output paper determination unit 203 determines that the number of pages of the unfixed-size paper does not exceed the threshold value (NO in step S322), the processing proceeds to step S323. In step S323, the output paper determination unit 203 selects information about the unfixed-size paper with the size corresponding to the page width and height included in the page size information 211 as the output paper information 215.

The threshold value included in the above described determination condition may be included as one piece of the first print setting information 213, for example, as illustrated in the unfixed-size paper automatic correction condition in FIG. 4B, or previously stored in a memory as an internal value.

When the output paper determination unit 203 determines that the number of pages of the unfixed-size paper exceeds the threshold value, the output paper determination unit 203 corrects a page corresponding to the page size information 211 based on the second print setting information 214. In step S331, the output paper determination unit 203 acquires information about the specified paper used as the output paper from the second print setting information 214.

The specified paper is default paper for the printer which is used, for example, when no paper size is specified in the PDL data. Alternatively, the specified paper can be suitably selected from usable paper types. A minimum fixed-size paper not exceeding the page width and height included in the page size information 211 may be selected.

In step S332, the result of selection, i.e., the information about the specified paper is stored as the output paper information 215. Upon completion of paper size selection in this way according to the output paper information 215 set in each of steps S304, S313, S323, and S332, the processing is completed.

In this example, the number of pages of the unfixed-size paper is counted and then the resultant count value is compared with the threshold value. The threshold value can be arbitrary set, thus user convenience can be improved. For example, when a large threshold value is set, a frequency at which the processing proceeds to step S331 decreases, thus influence on the usability can be reduced. Or, when a small threshold value is set, there arises an advantage that the user can frequently perform paper setting based on the second print setting information 214.

Returning to FIG. 2, processing performed after determining the output paper information 215 according to the flow chart in FIG. 3 will be described below. The layout determination unit 206 determines the layout information 216 required for output based on the determined output paper information 215, the first print setting information 213, the second print setting information 214, and the rendering command information 212.

The layout determination unit 206 transmits the determined layout information 216 to the image formation unit 207 and the image output unit 208. At this time, the layout determination unit 206 may further determine the layout information 216 in consideration of information about a device to be used. The layout information 216 includes information about rotation specifications and positional settings of the output image.

The image formation unit 207 forms data of the output image 217 based on the layout information 216 and the rendering command information 212. This process is commonly referred to as rendering. The image output unit 208 receives the layout information 216 and the data of the output image 217, and then performs image output processing. For example, the image output unit 208 outputs an image to the printer engine 112 or stores the formed image data and print setting information in the disk drive 103.

According to the first exemplary embodiment, print settings to be used for an unfixed page size can be performed in advance. Thus, in a case where the output paper is automatically determined, even if the PDL data includes both fixed and unfixed page size information pieces as the page size information 211, a desirable output can be obtained and user convenience can be improved.

The unfixed-size paper automatic correction condition has been described with reference to steps S321 and S322 in FIG. 3. More specifically, the number of pages of the unfixed-size paper is counted in step S321 and whether the counted number of pages of the unfixed-size paper exceeds the threshold value or not is determined in step S322. However, the processing for the unfixed-size paper automatic correction condition is not limited the above example but may be performed in such a way that an unfixed page size is compared with paper sizes within a predetermined reference rage or usable for the printer engine 112 in step S322 in FIG. 3 and then the processing of step S331 or S323 is performed according to a result of the comparison.

For example, when the unfixed page size is larger or smaller than a reference fixed page size, the processing proceeds to step S331 to enable acquiring the information about the specified paper as described above.

Thus, specified paper having a size suitable for a size of the unfixed-size paper can be set as output paper, printing with paper not intended by the user can be avoided, and user convenience can be improved. Further, an exemplary embodiment based on a combination of the number of pages of the unfixed-size paper, a page sizes, and other automatic correction conditions is also possible.

A second exemplary embodiment of the present invention will be described below. In the example described in the first exemplary embodiment, processing is performed on the premise that the second print setting to be used when a size of unfixed-size paper is specified is set before the start of printing. However, the processing is not limited thereto but the print setting may be changed at each time of printing.

Figure 5:
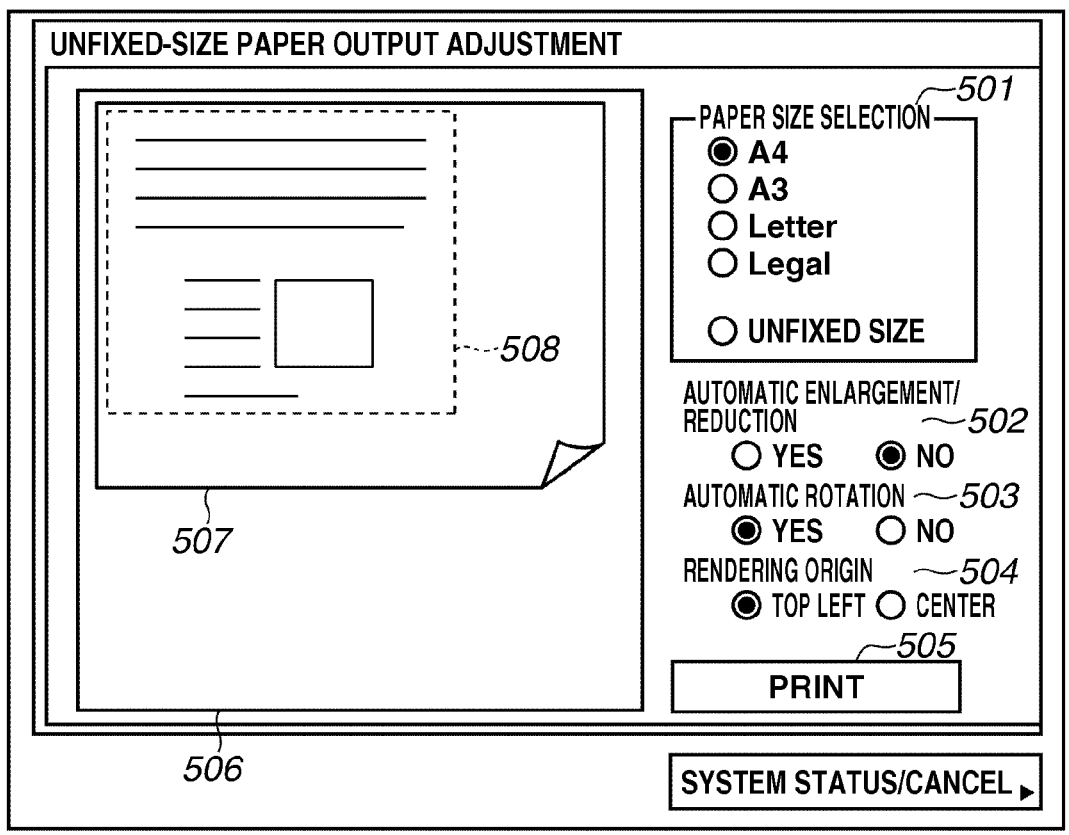
FIG. 5 illustrates an exemplary print setting screen according to a second exemplary embodiment of the present invention.

More specifically, when the output paper determination unit 203 determines that the number of pages of the unfixed-size paper exceeds the threshold value (YES in step S322 in the flow chart in FIG. 3), the setting screen (UI screen) in FIG. 5 is displayed. Then, it may be possible to provide a user, at each time of printing, with a method for selecting desirable paper and layout method for a size of unfixed-size paper with the UI in FIG. 5.

Although the thus-configured second exemplary embodiment will be described below, the description will be made centering on differences from the first exemplary embodiment since the basic configuration and processing are similar to those of the first exemplary embodiment.

Figure 3:
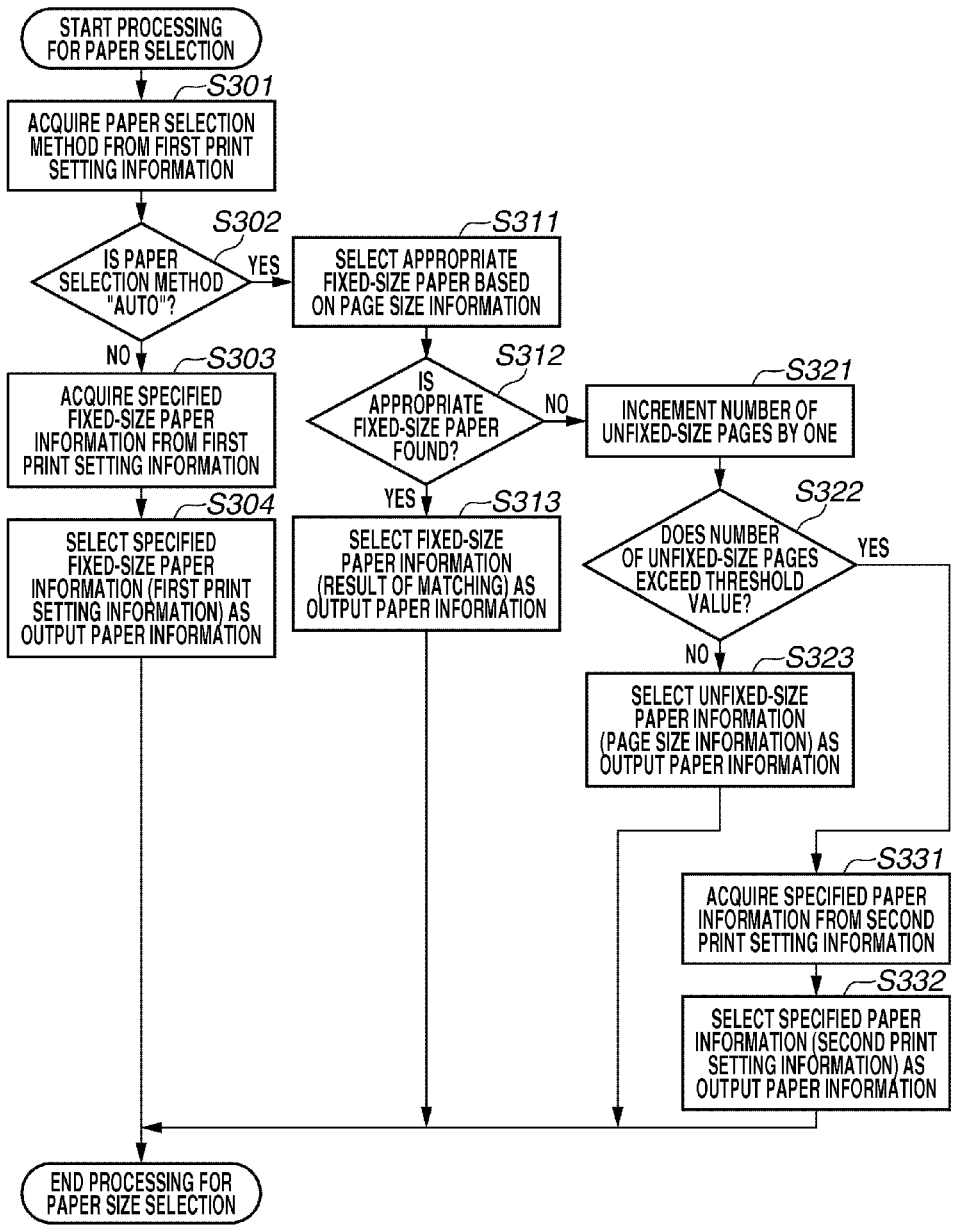
FIG. 3 is a flow chart illustrating an exemplary processing for determining a paper size.

To acquire the second print setting information 214 in step S331 in FIG. 3, the second print setting unit 205 displays the UI screen in FIG. 5. In this example, an output adjustment screen for a size of unfixed-size paper is displayed on the display device 108.

A preview area 506 includes a paper size frame 507 (drawn with solid lines) representing the paper size and an output preview image 508 (drawn with dotted lines) representing an output image size. This screen enables the user to adjust an output image layout while visually effectively checking the contents of the print settings made by the user.

The output preview image 508 does not necessarily represent the rendering command information 212. For example, when the PDL data includes a thumbnail image, the output preview image 508 may be the thumbnail image. Further, the output preview image 508 may be such a schematic diagram that enables the user to recognize the page size and upper and lower limits in the PDL data.

On a right-hand side of the preview area 506, options for various specification items, namely "Paper size selection", "Automatic enlargement/reduction", "Automatic rotation", and "Rendering origin" are indicated.

A size specification item 501 of "Paper size selection" is used to determine the output paper. In this example, the user can select desired paper from A4, A3, Letter, Legal, and "Unfixed size." When "Unfixed size" is selected, output processing is performed according to a size of unfixed-size paper having the page width and height included in the page size information 211.

A magnification specification item 502 of "Automatic enlargement/reduction" is used to specify whether the rendering contents are enlarged or reduced according to the paper width and height when the width and height of the paper are different from those included in the page size information 211.

A orientation specification item 503 of "Automatic rotation" is used to specify whether automatic rotation processing is performed to match top-and-bottom information included in the page size information 211 with the paper orientation based on the page width and height. In this example, automatic rotation processing is specified ("Yes"). Since a width of the output preview image 508 is larger than its height, a landscape paper orientation is specified as the paper orientation.

A rendering specification item 504 of "Rendering origin" is used to specify a position of a rendering origin on the output paper. In this example, "Top left" or "Center" can be selected. A print button 505 is provided under the above described items.

After determining the second print setting information including the output paper and layout specification information by using the specification items 501 to 504 and then pressing the print button 505, print processing is performed based on the determined print settings. Subsequent processing is similar to that in the first exemplary embodiment and therefore the relevant description will be omitted.

The UI screen illustrated in FIG. 5 may be displayed each time the processing of step S331 in FIG. 3 is performed in a single job. Alternatively, once print setting is completed, the same print setting may be used until one job is completed. Further, print setting may be configured to be able to switch between the first print setting information 213 and the second print setting information 214.

As described above, according to the second exemplary embodiment, each item for the print settings used for an unfixed page size can be set each time a page having a size of unfixed-size paper is processed. Thus, in a case where the output paper is automatically determined, even if the PDL data includes both fixed and unfixed page size information pieces as the page size information 211, a desirable output can be obtained and user convenience can be improved.

According to the present invention, when fixed-size paper suitable for the page size information cannot be determined, an effective print setting can be provided and the paper used for printing is selected based on the output paper information.

Aspects of the present invention can also be realized by a computer of a system or apparatus (or devices such as a CPU or MPU) specifically programmed to perform the functions of the above-described embodiment (s) or the method steps of the above-described processes, when the computer reads out and executes a program recorded on a memory device. For this purpose, the program is provided to the computer for example via a network or from a recording medium of various types serving as the memory device (e.g., a tangible computer-readable medium). Examples of computer-readable media include, but are not limited to, magnetic and optical devices, such as nonvolatile, hard-coded type media such as Read Only Memories (ROMS) or Erasable Electrically Programmable Read Only Memories (EEPROMs), recordable type media such as floppy disks, hard disk drives, CD-ROMs and DVD ROMs, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-231434 filed Oct. 5, 2009, which is hereby incorporated by reference herein in its entirety.

What is claimed is:

1. A printing apparatus which performs print processing by interpreting print data received from an information processing apparatus, the printing apparatus comprising:
   a setting unit configured to set information for determining output paper before receiving the print data in response to an instruction entered via an operation panel of the printing apparatus;
   a first determination unit configured to determine, based on page size information specified in the print data, fixed-size paper corresponding to the page size information;
   a count unit configured to count a number of pages for an unfixed-size paper, when the fixed-size paper corresponding to the page size information cannot be determined by the first determination unit;
   a second determination unit configured to determine whether or not the number of pages for the unfixed-size paper exceeds a predetermined value; and
   an image output unit configured to print, when the number of pages for the unfixed-size paper exceeds the predetermined value, the print data using paper selected according to the set information for determining output paper, and to print, when the number of pages for the unfixed-size paper does not exceed the predetermined value, the print data using an unfixed-size paper corresponding to the page size information.

2. A method for controlling a printing apparatus which performs print processing by interpreting print data received from an information processing apparatus, the method comprising:
   a setting step of setting information for determining output paper before receiving the print data in response to an instruction entered via an operation panel of the printing apparatus;
   a first determining step of determining, based on page size information specified in the print data, fixed-size paper corresponding to the page size information;
   a counting step of counting a number of pages for an unfixed-size paper, when the fixed-size paper corresponding to the page size information cannot be determined by the first determining step;
   a second determining step of determining weather or not the number of pages for the unfixed-size paper exceeds a predetermined value; and
   a printing step of printing, when the number of pages for the unfixed-size paper exceeds the predetermined value, the print data using paper selected according to the set information for determining output paper, and to print, when the number of pages for the unfixed-size paper does not exceed the predetermined value, the print data using an unfixed-size paper corresponding to the page size information.

3. A non-transitory storage medium storing a program to be executed by a printing apparatus which performs print processing by interpreting print data received from an information processing apparatus, the program comprising:
   a setting step of setting information for determining output paper before receiving the print data in response to an instruction entered via an operation panel of the printing apparatus;
   a first determining step of determining, based on page size information specified in the print data, fixed-size paper corresponding to the page size information;
   a counting step of counting a number of pages for an unfixed-size paper, when the fixed-size paper corresponding to the page size information cannot be determined by the first determining step;
   a second determining step of determining whether or not the number of pages for the unfixed-size paper exceeds a predetermined value; and
   a printing step causing the printing apparatus to print, when the number of pages for the unfixed-size paper exceeds the predetermined value, the print data using paper selected according to the set information for determining output paper, and to print, when the number of pages for the unfixed-size paper does not exceed the predetermined value, the print data using an unfixed-size paper corresponding to the page size information.

\* \* \* \* \*